United States Patent
Chamberlin et al.

(10) Patent No.: US 10,958,134 B2
(45) Date of Patent: Mar. 23, 2021

(54) COMPACT ELECTRIC MACHINE WITH COMBINED ROTOR CARRIER AND CLUTCH HOUSING

(71) Applicant: BorgWarner Inc., Auburn Hills, MI (US)

(72) Inventors: Bradley D. Chamberlin, Pendleton, IN (US); Sven N. Altlay, Friesenheim (DE); Jomon Kaniampalackal, Hockenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/680,049

(22) Filed: Nov. 11, 2019

(65) Prior Publication Data
US 2020/0083780 A1 Mar. 12, 2020

Related U.S. Application Data

(63) Continuation of application No. 15/926,852, filed on Mar. 20, 2018, now Pat. No. 10,511,207.
(Continued)

(51) Int. Cl.
*B60K 6/48* (2007.10)
*H02K 7/108* (2006.01)
(Continued)

(52) U.S. Cl.
CPC ............ *H02K 7/108* (2013.01); *B60K 6/26* (2013.01); *B60K 6/387* (2013.01); *B60K 6/48* (2013.01);
(Continued)

(58) Field of Classification Search
CPC ............ H02K 7/00; H02K 7/10; H02K 7/006; H02K 7/108; H02K 3/28; H02K 3/12; H02K 3/00; H02K 3/04; H02K 1/00; H02K 1/06; H02K 1/18; H02K 1/12; H02K 1/16; H02K 1/165; H02K 1/22; H02K 1/185; F16D 13/00; F16D 13/22; F16D 13/38; F16D 13/52; F16D 21/00; F16D 21/08;
(Continued)

(56) References Cited

U.S. PATENT DOCUMENTS 5,833,022 A * 11/1998 Welke ............... B60L 50/16
                                                            180/65.25
6,308,794 B1 * 10/2001 Oppitz .............. B60K 6/26
                                                            180/54.1
(Continued)

*Primary Examiner* — James M Dolak
(74) *Attorney, Agent, or Firm* — Maginot, Moore & Beck LLP

(57) ABSTRACT

An electric machine includes a stator assembly, a rotor positioned within the stator assembly, and a rotor carrier coupled to the rotor. The rotor carrier includes a hub portion, a first cylindrical portion coupled to the hub portion and defining a first diameter that is less than an inner diameter of the rotor, and a second cylindrical portion extending from the first cylindrical portion and defining a second diameter that is greater than the inner diameter of the rotor. A first clutch is positioned within the rotor carrier and engages an inner surface of the first cylindrical portion of the rotor carrier. A second clutch is positioned within the rotor carrier and engages an inner surface of the second cylindrical portion of the rotor carrier.

14 Claims, 8 Drawing Sheets

Related U.S. Application Data

(60) Provisional application No. 62/474,492, filed on Mar. 21, 2017.

(51) Int. Cl.
| | | |
|---|---|---|
| *B60K 6/26* | (2007.10) | |
| *B60K 6/387* | (2007.10) | |
| *F16D 13/52* | (2006.01) | |
| *F16D 21/08* | (2006.01) | |
| *H02K 1/16* | (2006.01) | |
| *H02K 1/22* | (2006.01) | |
| *H02K 3/12* | (2006.01) | |
| *H02K 3/28* | (2006.01) | |
| *H02K 7/00* | (2006.01) | |

(52) U.S. Cl.
CPC ............ *F16D 13/52* (2013.01); *F16D 21/08* (2013.01); *H02K 1/165* (2013.01); *H02K 1/22* (2013.01); *H02K 3/12* (2013.01); *H02K 3/28* (2013.01); *H02K 7/006* (2013.01); *B60K 2006/4825* (2013.01); *B60Y 2200/92* (2013.01); *Y02T 10/62* (2013.01); *Y10S 903/906* (2013.01); *Y10S 903/914* (2013.01)

(58) Field of Classification Search
CPC ... B60K 6/00; B60K 6/48; B60K 6/26; B60K 6/387
See application file for complete search history.

(56) References Cited

U.S. PATENT DOCUMENTS

| | | | |
|---|---|---|---|
| 6,455,968 B2 * | 9/2002 | Honorio | B60K 6/26 |
| | | | 180/294 |
| 6,490,914 B1 * | 12/2002 | Brandenburg | F02N 15/006 |
| | | | 73/114.26 |
| 6,655,484 B2 * | 12/2003 | Levin | B60K 6/22 |
| | | | 180/65.25 |
| 7,485,061 B2 | 2/2009 | Reisch | |
| 7,832,537 B2 | 11/2010 | Blessing | |
| 7,950,480 B2 | 5/2011 | Raoul | |
| 8,040,093 B2 | 10/2011 | Atarashi | |
| 8,084,908 B2 * | 12/2011 | Chiba | B60K 6/26 |
| | | | 310/102 R |
| 8,267,208 B2 * | 9/2012 | Kleuker | B60K 6/40 |
| | | | 180/65.22 |
| 8,397,845 B2 | 3/2013 | Yoshida | |
| 8,714,287 B2 | 5/2014 | Kim | |
| 9,403,429 B2 | 8/2016 | Baumgartner | |
| 9,479,027 B2 | 10/2016 | Ratte | |
| 9,662,966 B2 * | 5/2017 | El Baraka | B60K 6/26 |
| 9,950,605 B2 * | 4/2018 | Suyama | B60K 6/387 |
| 10,093,163 B2 | 10/2018 | Schmitt | |
| 10,167,907 B2 * | 1/2019 | Satoyoshi | F16D 25/0638 |
| 10,511,207 B2 * | 12/2019 | Chamberlin | B60K 6/485 |
| 10,562,388 B2 * | 2/2020 | Yagyu | F16H 33/02 |
| 10,644,560 B2 * | 5/2020 | Minami | H02K 7/14 |
| 10,749,402 B2 * | 8/2020 | Ohashi | H02K 5/02 |
| 10,770,934 B2 * | 9/2020 | Jakob | H02K 5/20 |
| 10,773,600 B2 * | 9/2020 | Roesner | H02K 7/108 |
| 10,784,737 B2 * | 9/2020 | Sakuma | H02K 3/28 |
| 2014/0265683 A1 | 9/2014 | Hossain | |
| 2017/0261045 A1 * | 9/2017 | Chamberlin | F16D 25/10 |

\* cited by examiner

COMPACT ELECTRIC MACHINE WITH COMBINED ROTOR CARRIER AND CLUTCH HOUSING

CROSS-REFERENCE TO RELATED APPLICATIONS

This application is a continuation of U.S. patent application Ser. No. 15/926,852, filed Mar. 20, 2018, which claims priority from U.S. Provisional Patent Application No. 62/474,492, filed Mar. 21, 2017, the entire contents of which are incorporated herein by reference.

FIELD

This document relates to the field of electric machines, and particularly electric machines with distributed stator windings for use in vehicles.

BACKGROUND

Dynamoelectric machines in automotive and other vehicle applications include alternators, alternator-starters, traction motors, hybrid drive motors, as well as other applications. The stator of an electric machine typically includes a cylindrical core formed as a stack of individual laminations and having a number of circumferentially spaced slots that extend axially through the stator core. A rotor assembly includes a center shaft and is coaxial with the stator core. The stator core has wires wound thereon in the form of windings. The windings include axial segments and end turn. The axial segments of the windings extend axially through the slots of the core. The end turns connect the axial segments at opposing axial ends of the stator core, each end turn provided as a partial loop that extends circumferentially from one slot to another. In this general manner, a stator winding extends axially from end to end in selected ones of the plurality of stator core slots and extends circumferentially between slots at the ends of the stator, according to a chosen wiring pattern.

The stator may be formed with any number of separate phase windings, such as three-phase, five-phase, six-phase, etc., and such determines the general wiring pattern to be implemented when winding the stator core. Stator windings may be provided in different shapes and configurations, including concentrated stator windings and distributed stator windings.

Depending on the application for the electric machine, a number of clutches may be associated with the electric machine. For example, in hybrid electric vehicles, it is common for an engine disconnect clutch and a launch clutch to be used in association with the electric machine. The engine disconnect clutch may be used to couple the electric machine to or decouple the electric machine from the internal combustion engine at different times. Similarly, the launch clutch may be used to couple the electric machine to or decouple the electric machine from the transmission at different times. Unfortunately, a large number of parts are required to build the electric machine and the associated clutches, thus adding to the cost of an assembly that includes the electric machine and clutches. Additionally, the unit that includes the electric machine and the associated clutches consumes a significant amount of space, and such space may be limited in various particular applications.

In view of the foregoing, it would be advantageous to provide an electric machine and clutch unit having a reduced number of components, thereby saving significant costs to manufacture the unit. Additionally, it would be advantageous to provide an electric machine and clutch unit with a reduced axial length, thereby saving space within the particular application environment. It would also be advantageous if such electric machine and clutch unit provided for increased performance of the electric machine and clutches.

SUMMARY

In accordance with one exemplary embodiment of the disclosure, there is provided an electric machine including a stator assembly, a rotor positioned within the stator assembly, and a rotor carrier positioned within the stator assembly and coupled to the rotor. The rotor carrier includes a hub portion, a first cylindrical portion, and a second cylindrical portion. The first cylindrical portion is coupled to the hub portion and defines a first diameter that is less than an inner diameter of the rotor. The second cylindrical portion extends from the first cylindrical portion and defines a second diameter that is greater than the inner diameter of the rotor. A first clutch is positioned within the rotor carrier and engages an inner surface of the first cylindrical portion of the rotor carrier. A second clutch is positioned within the rotor carrier and engages an inner surface of the second cylindrical portion of the rotor carrier.

Pursuant to another exemplary embodiment of the disclosure, there is provided an electric machine including a stator assembly, a rotor positioned within the stator assembly, and a rotor carrier positioned within the stator assembly and coupled to the rotor. The rotor carrier includes a first cylindrical portion, a second cylindrical portion, and a radial portion. The first cylindrical portion has an inner surface defining an inner diameter that is less than an inner rotor diameter. The second cylindrical portion has an inner surface defining a diameter that is greater than the inner rotor diameter. The radial portion extends radially between the first cylindrical portion and the second cylindrical portion. The first cylindrical portion, the radial portion, and the second cylindrical portion are an integrally formed unitary component. A first clutch is positioned within the first cylindrical portion of the rotor carrier, and a second clutch is positioned within the second cylindrical portion of the rotor carrier.

Pursuant to yet another exemplary embodiment of the disclosure, a rotor carrier is provided for an electric machine. The rotor carrier includes a hub portion, a first radial portion, a first cylindrical portion, a second radial portion, and a second cylindrical portion. The first radial portion extends radially outward from the hub portion. The first cylindrical portion extends axially from the first radial portion and defines a first diameter. The second radial portion extends radially outward from the first cylindrical portion. The second cylindrical portion extends axially from the second radial portion and defines a second diameter that is greater than the first diameter. The hub portion, the first radial portion, the first cylindrical portion, the second radial portion, and the second cylindrical portion are an integrally formed unitary component.

The above described features and advantages, as well as others, will become more readily apparent to those of ordinary skill in the art by reference to the following detailed description and accompanying drawings. While it would be desirable to provide a compact electric machine that provides one or more of these or other advantageous features, the teachings disclosed herein extend to those embodiments

DESCRIPTION

Figure 1:
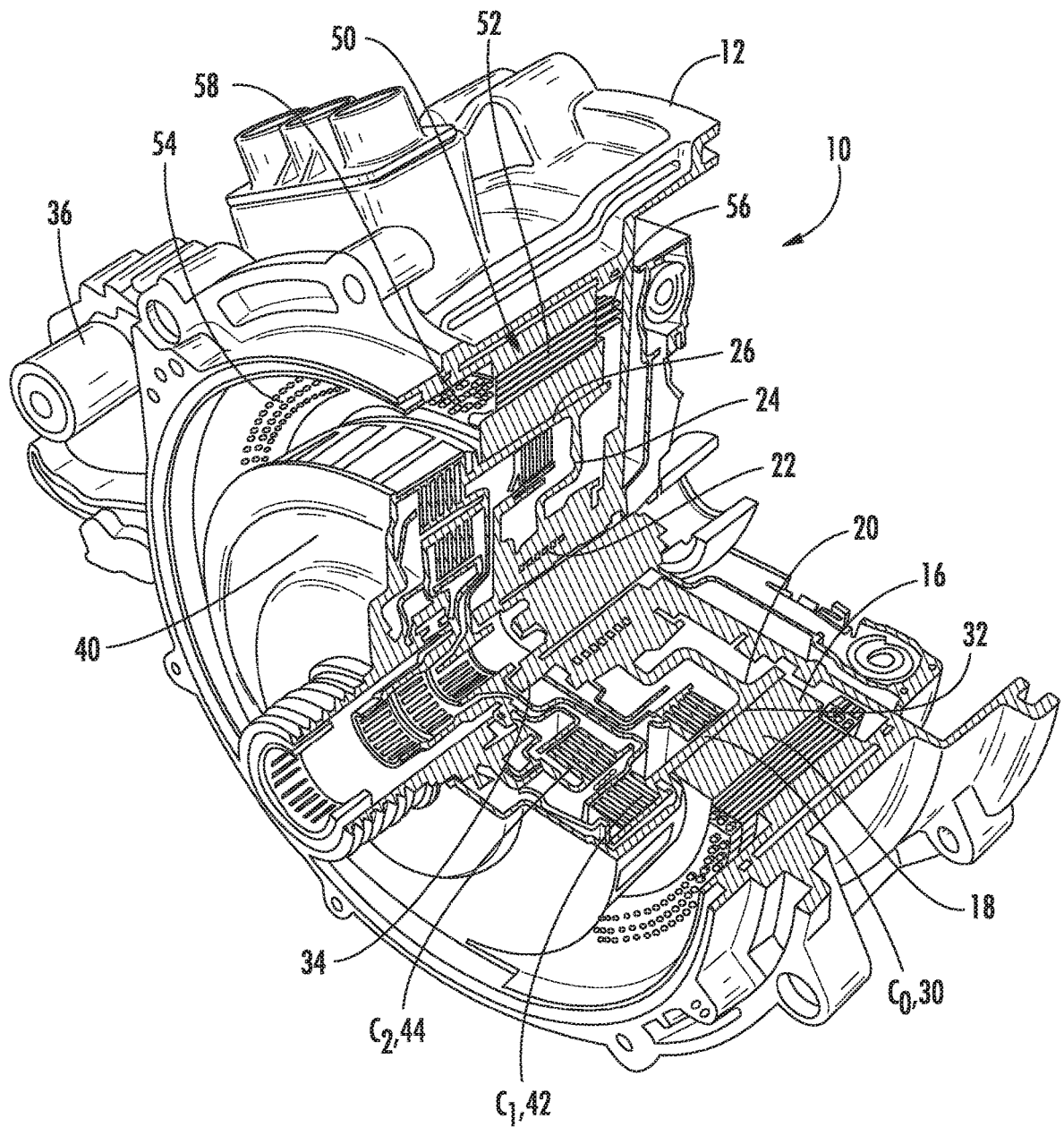
FIG. 1 shows a perspective cutaway view of an electric machine having a rotor carrier and clutch housing.

With reference to FIG. 1, an electric machine 10 is shown. The electric machine 10 includes a housing 12 that encloses a rotor 16 and a stator assembly 50. The rotor 16 is positioned on a rotor carrier 20, and an engine disconnect clutch 30 is positioned inside of the rotor 16 and rotor carrier. A dual clutch 40 is positioned adjacent to the disconnect clutch 30. The dual clutch 40 includes a first/outer clutch 42 and a second/inner clutch 44. The rotor carrier 20 is a unitary component that provides a rotor hub 22 and a clutch housing for both the engine disconnect clutch 30 and the dual clutch 40.

The rotor 16 of the electric machine 10 may be provided in any of various forms commonly known to those of skill in the art. In the disclosed embodiment, the rotor 16 includes a plurality of permanent magnets 18 embedded in a ferromagnetic material (e.g., a lamination stack). However, it will be recognized that in other embodiments, the rotor carrier may be configured without permanent magnets and with rotor windings, such as an induction, synchronous reluctance, or other type of electric machine. The rotor 16 is mounted on and fixed to the rotor carrier 20.

The rotor carrier 20 is generally cylindrical in shape and includes a radial portion 24 and a circumferential portion 26. The radial portion 24 extends between the rotor hub 22 and the circumferential portion 26. The rotor 16 is mounted on the circumferential portion 26 of the rotor carrier 20. The circumferential portion 26 also provides a clutch housing for both the engine disconnect clutch 30 and the dual clutch 40.

The rotor carrier 20 is a unitary component such that the rotor hub 22, the radial portion 24 and the circumferential portion 26 are all integrally formed from the same material and the various portions are all non-removable from one another without destruction of one or more of the respective portions. Accordingly, while different portions or sections of the rotor carrier may be identified, each portion is integrally formed with one or more adjacent sections and is not configured for removal therefrom. In at least one embodiment, the rotor carrier 20 is comprised of a metallic material such as steel, aluminum, or any of various other metals commonly utilized in electric motors and generators. In at least some embodiments, the rotor carrier may be comprised of a non-metallic material such as a relatively rigid polymer material with high heat resistance. The rotor carrier 20 may be formed by any of various means such as casting, flow-molding, etc.

As noted previously, the electric machine 10 in the embodiment of FIG. 1 includes three clutches, including the engine disconnect clutch 30, the outer clutch 42 of the dual clutch 40, and the inner clutch 44 of the dual clutch 40. The engine disconnect clutch may also be referred to herein as clutch "$C_0$." The outer clutch 42 of the dual clutch 40 is a launch clutch and may be referred to herein as clutch "$C_1$." The inner clutch 44 of the dual clutch 40 is a launch clutch for a reverse gear (or in some cases a $2^{nd}$ gear) and is also referred to herein as clutch "$C_2$." Although clutches $C_1$ and $C_2$ are shown in FIG. 1 in a nested configuration, it will be appreciated that clutches $C_1$ and $C_2$ may be arranged differently in other configurations, such as a side-by-side/parallel alignment. Furthermore, as noted in further detail below, including the embodiment of FIG. 10, one or more of clutches $C_0$, $C_1$ and $C_2$ may not be included in some embodiments.

Figure 7:
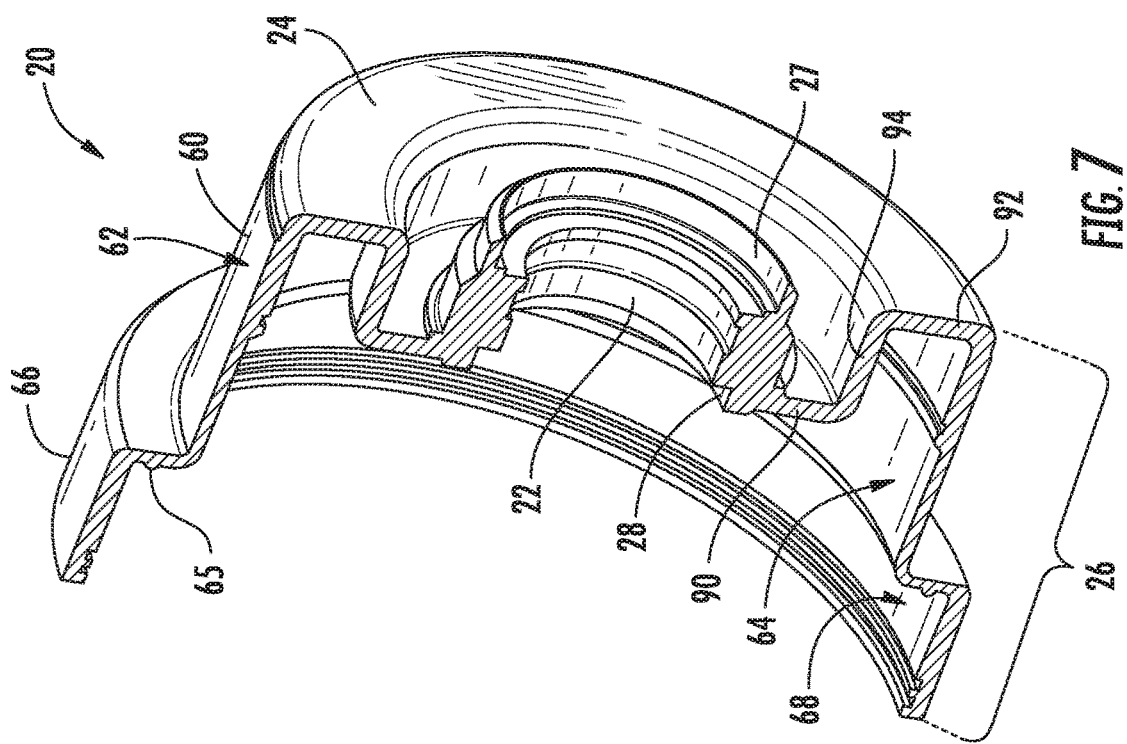
FIG. 7 shows the cutaway view of FIG. 5 rotated to show a second axial side of the combined rotor carrier and clutch housing.

With continued reference to FIG. 1, the engine disconnect clutch $C_0$ (30) is positioned at least partially within the rotor carrier 20. The clutch $C_0$ is configured to connect or disconnect the electric machine 10 and an engine (e.g., see the internal combustion engine 82 as shown in FIG. 7). In the embodiment of FIG. 1, the clutch $C_0$ is positioned completely within the rotor carrier 20, and the circumferential portion 26 of the rotor carrier 20 serves as a housing for the clutch $C_0$. The clutch $C_0$ may be provided in any of a number of forms, such as various types of friction clutches, or any of various other clutches. In at least one embodiment, the clutch $C_0$ includes multiple plates 32, including a first set of plates that are locked to the rotor carrier 20 and a second set of plates that are locked to an output shaft 34. When the clutch $C_0$ is open with the plates 32 disengaged, the output shaft 34 is free to rotate relative to the rotor carrier 20; when the clutch $C_0$ is closed with the plates 32 engaged, the output shaft 34 is locked in rotation with the rotor carrier 20.

With continued reference to FIG. 1, the dual clutch 40 is also packaged within in the housing 12 of the electric machine 10 adjacent to the rotor 16. As noted previously, the dual clutch 40 includes clutch $C_1$ (42) and a clutch $C_2$ (44). Clutch $C_1$ and clutch $C_2$ are each configured to be engaged or disengaged with a transmission (e.g., see the transmission 84 as shown in FIG. 7). Accordingly, the dual clutch 40 may also be referred to herein as a "transmission clutch."

Each clutch $C_1$ and $C_2$ may be selectively opened (disengaged from the transmission) or closed (engaged with the transmission) in order to change the gear reduction in the transmission, thus providing for the switching of gears within a vehicle. If both clutches $C_1$ and $C_2$ are opened when the engine is running, and the clutch $C_0$ is closed, the electric machine 10 acts a generator that is driven by the engine during the times the vehicle is not being propelled by the transmission. Similar to clutch $C_0$, the dual clutch 40, including clutches $C_1$ and $C_2$, may also be provided in any of various forms. In the embodiments disclosed herein, clutches $C_1$ and $C_2$ are each provided as a friction clutch including multiple plates.

A clutch control module 36 is provided on the outside of the housing 12 of the electric machine. The clutch control module 36 includes electronics that control whether the engine disconnect clutch 30 and the dual clutch 40 are open or closed at any given time. The clutch control module 36 may also provide electronics configured to control the transmission, as noted in further detail below.

The rotor 16 and the rotor carrier 20 of the electric machine 10 are configured to rotate within a stator assembly 50. The stator assembly 50 includes a core 52 with windings 54 arranged on the core 52. The core 52 is generally cylindrical in shape and is comprised of a plurality of laminations. The laminations are generally annular in shape and are comprised of a ferromagnetic material. The laminations are stacked one on top of another to form the complete core 52. A plurality of axial slots are formed in the core 52. The slots are separated by teeth and extend in an axial direction through the stator core 52 from one end to an opposite end. The slots are configured to receive the stator windings 54.

The stator windings 54 of the electric machine 10 are formed from conductors inserted into the slots of the stator core 52. The stator windings 54 include a first end turn portion 56, a second end turn portion 58, and an in-slot portion. The first end turn portion 56 extends from one end of the stator core 52, and the second end turn portion 58 extends from the opposite end of the stator core 52. The in-slot portion of the stator windings 54 extend through the slots in the stator core 52 from one end to the opposite end.

Figure 2:
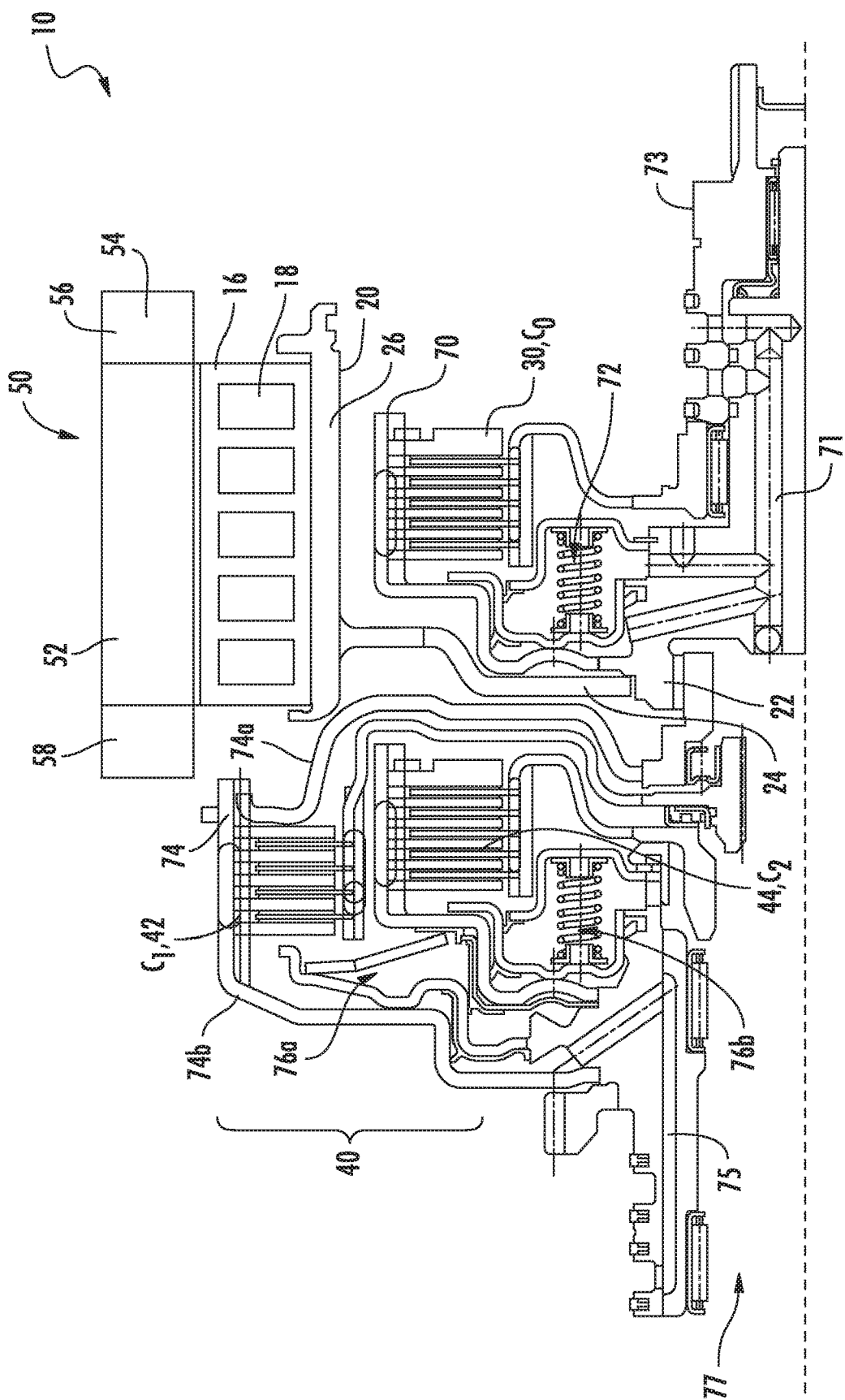
FIG. 2 shows a cross-sectional view of one embodiment of a rotor carrier and clutch housing for the electric machine of FIG. 1.

With reference now to FIG. 2, a cross-sectional view of an alternative arrangement for the electric machine 10 is shown. In this embodiment, the rotor carrier 20 is connected to the rotor hub 22, but is not integrally formed with the rotor hub 22 and various clutch housings. In the arrangement of FIG. 2, the rotor carrier 20 is generally cylindrical in shape and includes a radial portion 24 and a circumferential portion 26. The radial portion 24 extends between the rotor hub 22 and the circumferential portion 26. The rotor 16 is mounted on the circumferential portion 26 of the rotor carrier 20 and is rotatable within the stator assembly 50. The arrangement of FIG. 2 includes a first clutch housing 70 and a second clutch housing 74.

The first clutch housing 70 in the arrangement of FIG. 2 provides a housing for the engine disconnect clutch 30. The first clutch housing 70 is connected to the rotor hub 22 and is positioned within the rotor carrier 20. The first clutch housing 70 extends radially outward and engages the outer diameter of the clutch plates of the engine disconnect clutch 30. Fluid from line 71 controls the pressure member 72 (e.g., a piston member). When the pressure member 72 applies pressure to the plates of the engine disconnect clutch 30, the clutch is closed and the first clutch housing 70 and connected rotor carrier 20 are locked to the engine output shaft 73 via the plates of the engine disconnect clutch 30. When pressure is released from the plates of the engine disconnect clutch 30, the clutch is opened and the rotor carrier 20 and rotor hub 22 are freely rotatable relative to the engine output shaft 73.

The second clutch housing 74 in the arrangement of FIG. 2 provides a housing for the dual clutch 40 which is positioned axially adjacent to the rotor 16 and rotor carrier 20. The second clutch housing 74 includes a first portion 74a and a second portion 74b. The first portion 74a is connected to the rotor hub 22 and extends radially alongside the rotor carrier 20. The second portion 74b is connected to the first portion 74a via a weld or other connection and engages the outer diameter of the clutch plates of clutch $C_1$ (42). Fluid from one or more lines, such as line 75, controls the pressure members 76a and 76b. Pressure member 76a controls operation of the outer clutch $C_1$, and pressure member 76b controls operation of the inner clutch $C_2$. When the pressure member 76a applies pressure to the plates of clutch $C_1$, the clutch is closed and locked to the transmission input shaft 77. When pressure is released from the plates of clutch $C_1$, the clutch $C_1$ is opened and freely rotatable relative to the engine output shaft 73. When the pressure member 76b applies pressure to the plates of clutch $C_2$, the clutch is closed and locked to the transmission input shaft 77. When pressure is released from the plates of clutch $C_2$, the clutch $C_2$ is opened and freely rotatable relative to the engine output shaft 73.

Figure 3:
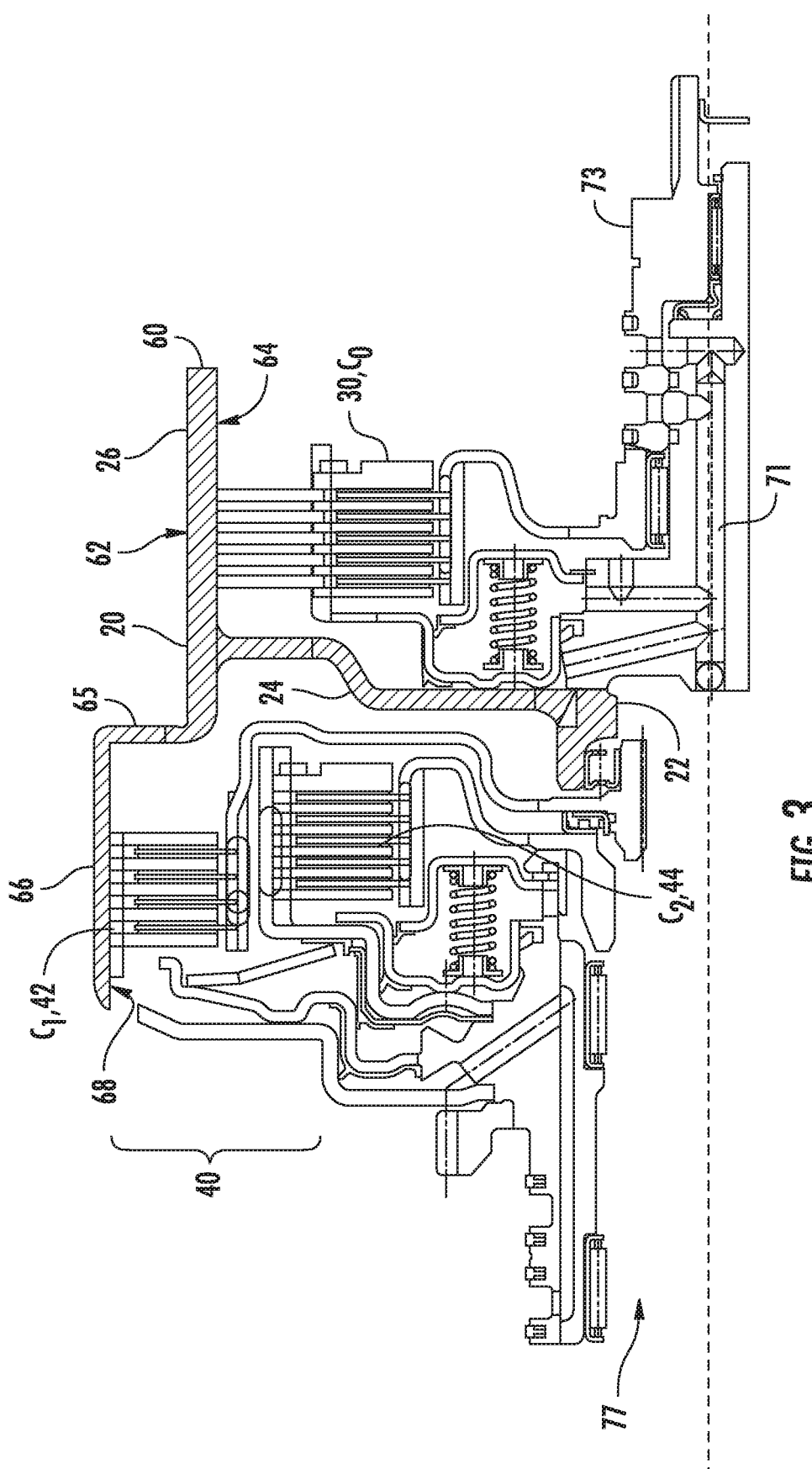
FIG. 3 shows a cross-sectional view of another embodiment of a rotor carrier and clutch housing for the electric machine of FIG. 1 wherein the rotor carrier and clutch housing are combined.

As described above, in the arrangement of FIG. 2 the rotor carrier 20, the rotor hub 22, the first clutch housing 70 and the second clutch housing 74 are not provided as a unitary component. However, FIG. 3 discloses an embodiment of a compact electric machine 10 wherein the rotor carrier 20, the rotor hub 22, the first clutch housing 70, and the second clutch housing 74 are all provided as an integrally formed unitary component. The rotor carrier of FIG. 3 is shown in cross-hatching and includes an integrally formed rotor hub 22, a radial portion 24 and a circumferential portion 26. The radial portion 24 extends radially outward from the hub 22 to the circumferential portion 26. The circumferential portion 26 includes a first cylindrical portion 60 and a second cylindrical portion 66. The radial portion 24 is connected to the first cylindrical portion 60. The second cylindrical portion 66 extends axially away from the first cylindrical portion 60 and has a greater diameter than the first cylindrical portion 60. An outer wall 65 extends in the radial direction between the first cylindrical portion 60 and the second cylindrical portion 66. The radial portion 24 that extends from the rotor hub 22 to the first cylindrical wall is positioned between the engine disconnect clutch 30 and the dual clutch and separates the engine disconnect clutch 30 from the dual clutch 40 within the rotor carrier 20.

With continued reference to FIG. 3, the first cylindrical portion 60 of the circumferential portion 26 of the rotor carrier 20 is substantially cylindrical in shape and includes an outer surface 62 and an inner surface 64. The rotor 16 (not shown in FIG. 3) is mounted on the outer surface 62 of the first cylindrical portion 60. A number of the plates of the engine disconnect clutch 30 engage the inner surface 64 of the first cylindrical portion 60 of the rotor carrier 20. Similarly, the second cylindrical portion 66 is substantially cylindrical in shape and includes an outer surface and an inner surface 68. A number of the plates of clutch $C_1$ engage the inner surface 68 of the second cylindrical portion 66 of the rotor carrier 20. Accordingly, the rotor carrier 20 in the embodiment of FIG. 3 not only provides a rotor mount and rotor hub, but also provides a combined clutch housing for both the engine disconnect clutch 30 and the dual clutch 40.

Advantageously, the embodiment of the combined rotor carrier, rotor hub and clutch housing of FIG. 3 allows for the reduction of a number of components over the arrangement of FIG. 2. In particular, the first clutch housing 70 and the portion 74a of the second clutch housing 74 of FIG. 2 are completely removed in the embodiment of FIG. 3. This allows the embodiment of the electric machine and clutch arrangement of FIG. 3 to have a reduced axial length in comparison to the arrangement of FIG. 2. Additionally, because the engine disconnect clutch 30 is configured to engage the inner surface 64 of the rotor carrier 20, the size of the friction plates of the engine disconnect clutch 30 can be increased. Because the size of the friction plates is increased, the number of friction plates can be reduced. In particular, the effective friction radius is increased by the enlargement of the plates, resulting in an equivalent torque transfer with the same pressure applied by the reduced number of friction interfaces.

Figure 4:
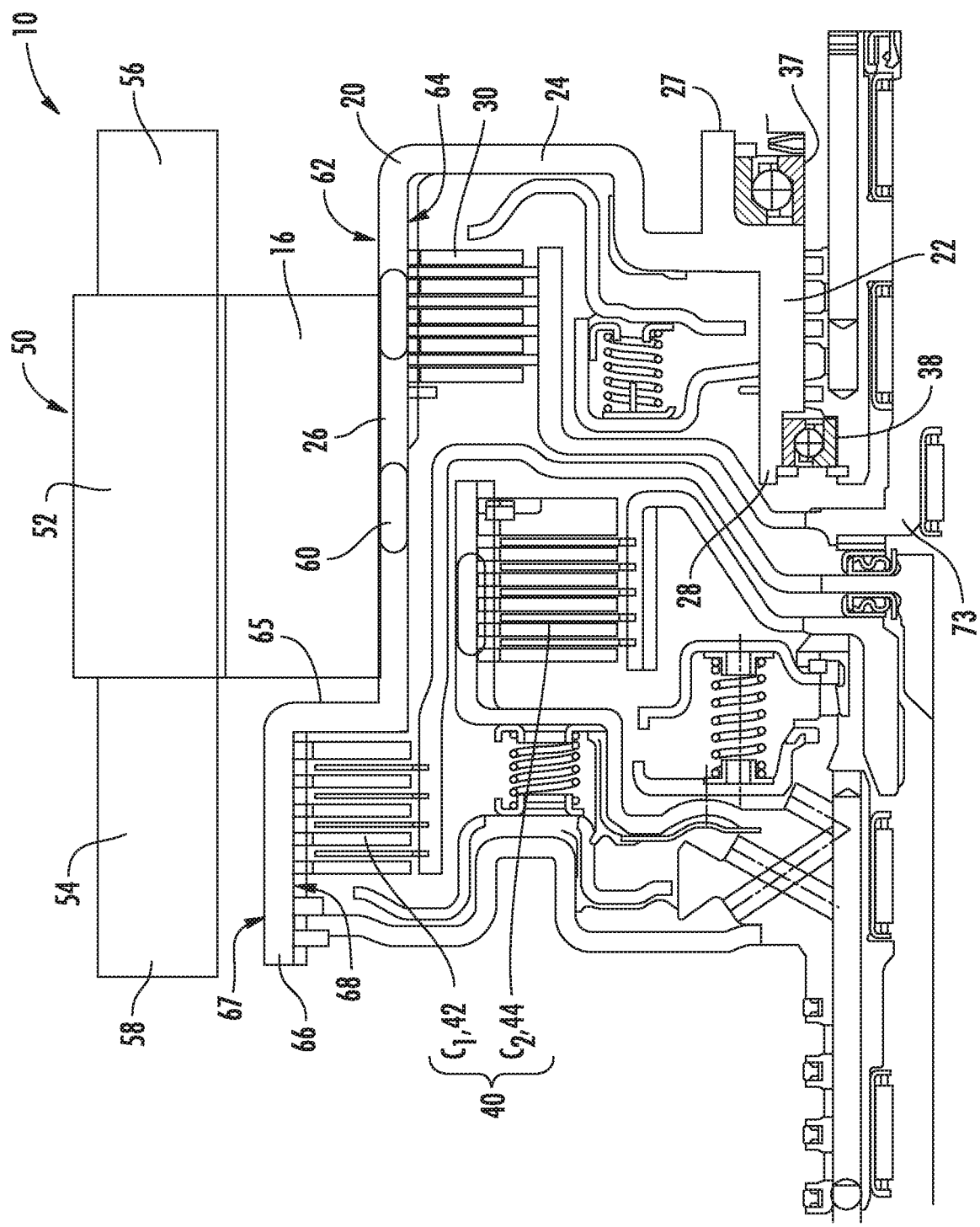
FIG. 4 shows a cross-sectional view of another embodiment of the combined rotor carrier and clutch housing for the electric machine of FIG. 1.
Figure 6:
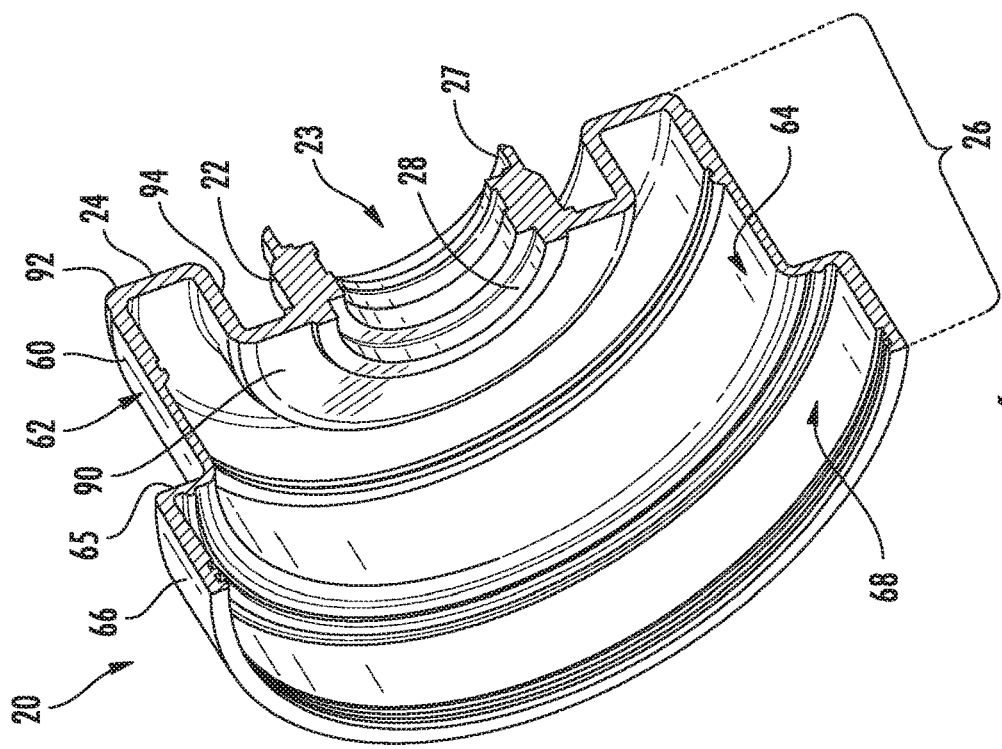
FIG. 6 shows an cutaway view of the first axial side of the combined rotor carrier and clutch housing of FIG. 5.
Figure 5:
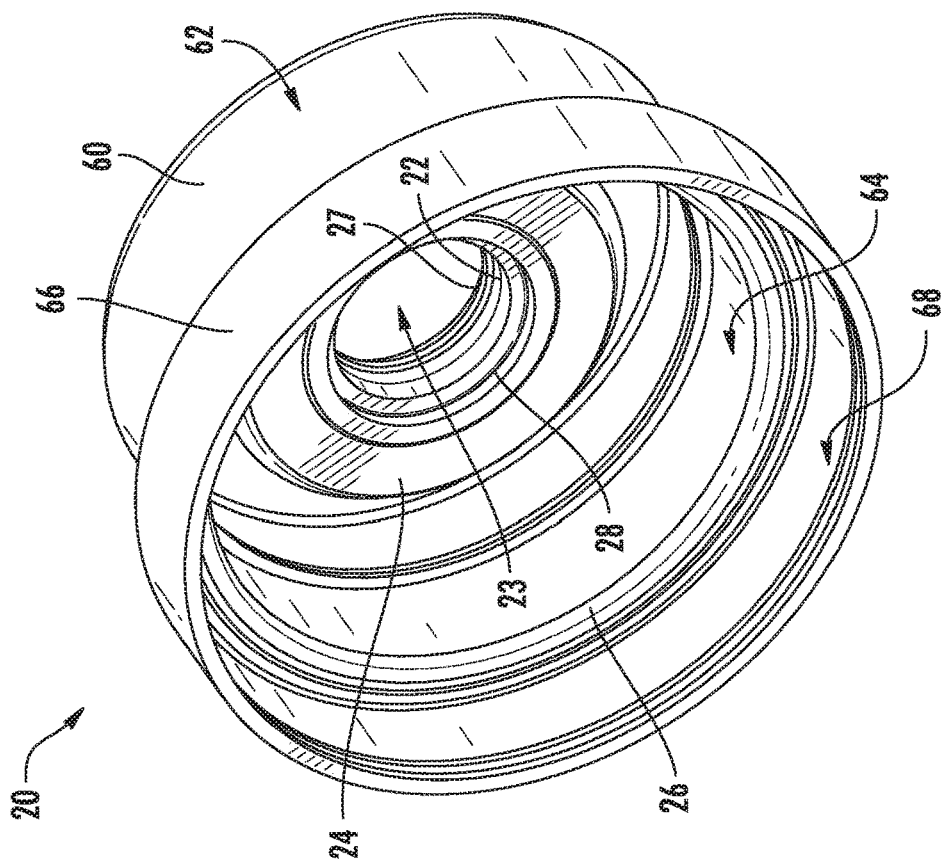
FIG. 5 shows a perspective view of a first axial side of the combined rotor carrier and clutch housing of FIG. 4.
Figure 8:
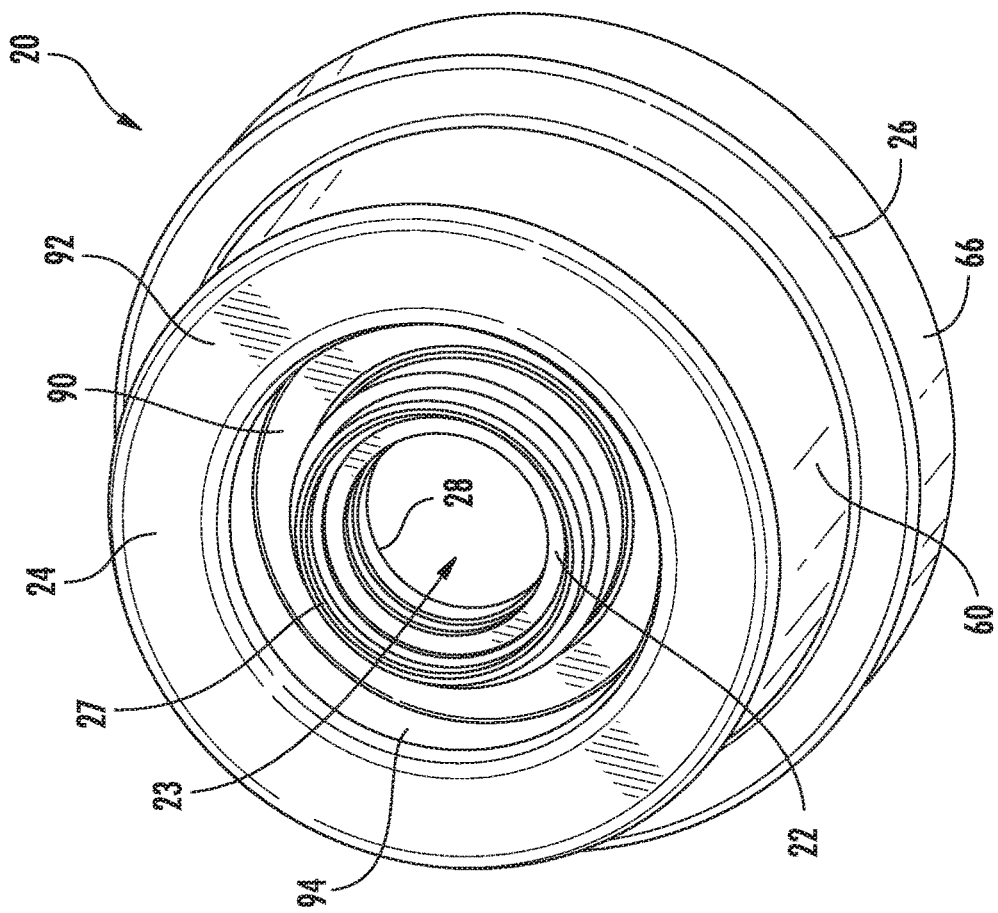
FIG. 8 shows a perspective view of the second axial side of the combined rotor carrier and clutch housing of FIG. 5.

With reference now to FIG. 4 yet another embodiment of a rotor carrier 20, with a combined rotor hub and clutch housing is shown. The embodiment of the rotor carrier 20 in FIG. 4 is similar to that of FIG. 3, and includes a rotor hub 22, a radial portion 24, and a circumferential portion 26. The rotor hub 22 includes a first lip 27 providing a first round surface (i.e., cylindrical surface) configured to engage a first bearing 37 and a second lip 28 providing a second round surface configured to engage a second bearing 38. The radial portion 24 extends radially outward from the rotor hub 22 to the circumferential portion 26. The circumferential portion 26 includes a first cylindrical portion 60 and a second cylindrical portion 66. Unlike the embodiment of FIG. 3, the radial portion 24 of the rotor carrier 20 in the embodiment of FIG. 4 is not positioned between the engine disconnect clutch 30 and the dual clutch 40. Instead, the radial portion 24 of the rotor carrier 20 is positioned at an end of the rotor carrier 20 and both the engine disconnect clutch 30 and the dual clutch 40 are on the same side of the radial portion 24. With this arrangement, the second cylindrical portion 66 of the circumferential portion 26 extends axially from one end of the first cylindrical portion 60, and the radial portion 24 extends radially another end of the first circumferential portion 60.

With continued reference to FIG. 4, the first cylindrical portion 60 of the circumferential portion 26 of the rotor carrier 20 is generally cylindrical in shape and includes an outer surface 62 and an inner surface 64. The rotor 16 is mounted on the outer surface 62 of the first cylindrical portion 60. Some of the plates of the engine disconnect clutch 30 engage the inner surface 64 of the first cylindrical portion 60 of the rotor carrier 20. Other plates of the engine disconnect clutch 30 engage a member that is connected to the engine output shaft 73. Similarly, the second cylindrical portion 66 is generally cylindrical in shape and includes an outer surface 67 and an inner surface 68. Some of the plates of clutch $C_1$ engage the inner surface 68 of the second cylindrical portion 66 of the rotor carrier 20. Other plates of the launch clutch are connected to one of the transmission input shafts. For example, in a transmission with a dual clutch, such as that shown in FIGS. 2-4, there are typically two transmission input shafts, with the outer clutch $C_1$ attached to one transmission input shaft and the inner clutch $C_2$ attached to another transmission input shaft.

Based on the foregoing description, it will be recognized that the rotor carrier 20 in the embodiments of FIGS. 3 and 4 not only provides the function of retaining the rotor 16, but also provides a rotor hub 22 as well as a combined clutch housing for both the engine disconnect clutch 30 and the dual clutch 40. Advantageously, the rotor carrier 20 with a combined rotor hub and clutch housing, such as that shown in FIGS. 3 and 4, utilizes less material and has fewer parts than other arrangements, and may therefore be manufactured for less cost. Additionally, similar to the embodiment of FIG. 3, the electric machine 10 having a rotor carrier 20 with a combined rotor hub and clutch housing as shown in FIG. 4 provides an arrangement for an electric machine with a reduced axial length. For example, the arrangement of FIG. 4 reduces the axial length of the electric machine 10 by more than 20 mm over the arrangement of FIG. 2. As noted previously, this not only reduces the cost of the electric machine but also allows the electric machine to be used in applications with limited space configurations.

With reference now to FIGS. 5-8, the rotor carrier 20 is shown in isolation. The rotor carrier 20 is generally cylindrical in shape and includes a rotor hub 22 (which is also referred to herein as a (hub portion 22), a radial portion 24 extending in a generally radial direction from the hub portion 22, and a circumferential portion 26 extending in a generally axial direction from the radial portion 24. As noted previously, the hub portion 22, radial portion 24 and the circumferential portion 26 are all comprised of a common material (e.g., a metal or polymer material) formed as a unitary structure wherein the radial portion 24 is integral with both the hub portion 22 and the circumferential portion 26. Accordingly, none of the hub portion 22, radial portion 24 or circumferential portion 26 may be removed from any other portion without destruction of the unitary component as a whole.

With continued reference to FIGS. 5-8, the hub portion 22 is defined by a circular opening 23 and is configured to receive an output shaft of an internal combustion engine (e.g., see output shaft 73 of FIG. 3). The hub portion 22 includes a first lip 27 and a second lip 28. The first lip 27 is configured to engage a first bearing (e.g., see bearing 37 of FIG. 4) positioned between the output shaft and the first lip 27. The second lip 28 is configured to engage a second bearing (e.g., see bearing 38 of FIG. 4) positioned between the output shaft and the second lip 28.

The radial portion 24 extends radially outward from the hub portion 22. In the embodiment of FIGS. 5-8, the radial portion 24 includes a first radial wall 90 and a second radial wall 92, with an axial connecting wall 94 extending between the first radial wall 90 and the second radial wall 92. When positioned in the electric machine 10 in a vehicle, the radial portion 24 faces an internal combustion engine and provides a covering for the clutches 30, 40 at one end of the electric machine. The radial portion 24 extends a radial distance between the hub portion 22 and the circumferential portion 24.

The circumferential portion 26 of the rotor carrier 20 includes a first cylindrical portion 60 and a second cylindrical portion 66. One end of the first cylindrical portion 60 is connected to the radial portion 24 and an opposite end of the first cylindrical portion 60 is connected to the second cylindrical portion 66. The second cylindrical portion 66 has a greater diameter than the first cylindrical portion 60. An outer wall 65 extends in a radial direction between the first cylindrical portion 60 and the second cylindrical portion 66, thereby bridging the difference in the diameters of the first cylindrical portion 60 and the second cylindrical portion.

Together, the hub portion 22, the radial portion 24, and the circumferential portion 26 of the rotor carrier 20 form a cup-like structure defining an interior space. Various components are arranged within the interior space, including the engine disconnect clutch 30 and the dual clutch 40. An inner surface 64 of the first cylindrical portion 60 is configured to engage the engine disconnect clutch 30. An inner surface 68 of the second cylindrical portion 66 is configured to engage the dual clutch 40, and particularly clutch $C_1$. On the outside of the rotor carrier 20, an outer surface 62 of the first cylindrical portion 60 is configured to provide a mount for the rotor 16 of the electric machine 10.

Figure 9:
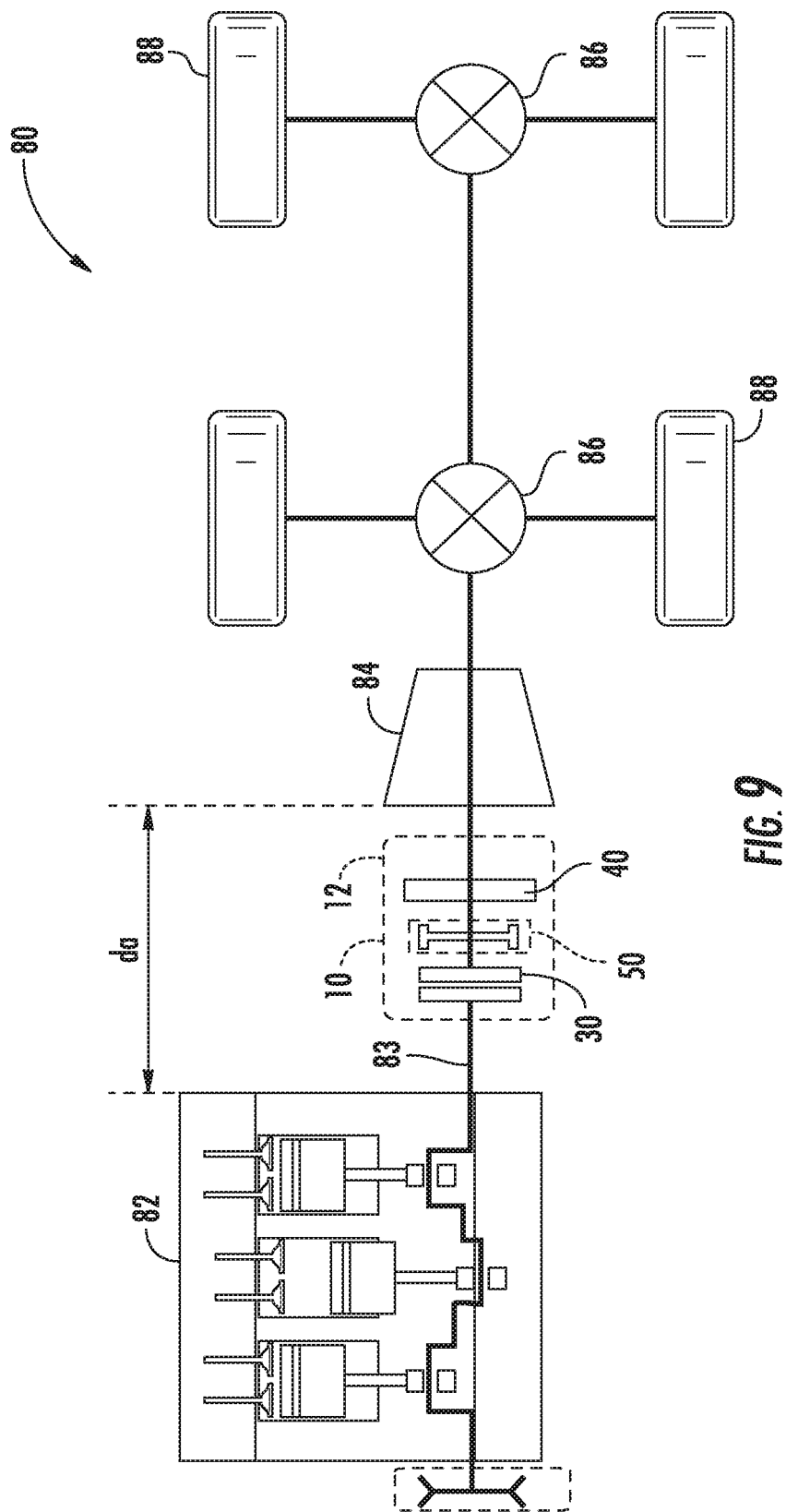
FIG. 9 shows a vehicle with the electric machine of FIG. 1 positioned therein.

With reference now to FIG. 9, in at least one embodiment, the electric machine 10 with the unitary rotor carrier 20 is positioned within a vehicle and particularly a hybrid electric vehicle (HEV) 80. The HEV 80 includes an engine 82, the electric machine 10, a transmission 84, one or more differentials 86, and vehicle drive members in the form of vehicle wheels 88. The electric machine 10 is positioned between the engine 82 and the transmission 84. As described above, the electric machine 10 includes a rotor carrier 20 with a combined rotor hub and clutch housing. A number of clutches are retained with the rotor carrier 20 including an engine disconnect clutch 30 and a dual clutch 40. The engine disconnect clutch 30 couples or uncouples the engine 82 to or from the electric machine 10, and the dual clutch 40 couples or uncouples the transmission 84 to or from the electric machine 10.

The engine 82 in the embodiment of FIG. 9 is an engine that may be used in association with vehicles, such as an internal combustion engine. It will be recognized that in at least one alternative embodiment, the engine 82 is provided by an alternative power source, such as a compressed air engine, turbine or other power source. Furthermore, the engine 82 may be configured to use any of various fuel sources such as gasoline, diesel, biofuel, etc. The engine 82 includes an output shaft 83 that is coupled to the transmission 84 via the clutches 30 and 40 associated with the electric machine 10.

The transmission 84 may be any of various types of transmissions, such as an automatic step-ratio transmission, a continuously variable transmission, etc. The transmission is connected to the drive wheels 88 in a conventional manner which may include one or more differentials 86, as shown in FIG. 9. The transmission may provide the vehicle with two drive wheels (e.g., front wheel drive or rear wheel drive) or four drive wheels (e.g., four wheel drive). The transmission is controlled using a transmission control unit to operate on a shift schedule that connects and disconnects elements within the gear box of the transmission to control the ratio between the transmission output and the transmission input. In at least one embodiment, the transmission control unit is provided by the control module 36 and is also configured to control operation of the engine disconnect clutch 30 and the dual clutch 40, as well as various other components within the transmission 84 or the housing 12 of the electric machine.

A relatively small space exists in the vehicle 80 between the engine 82 and the transmission 84. The space may be defined in general by an axial dimension and two radial dimensions. The axial dimension tends to be particularly limiting as a relatively small distance is provided between the engine and the transmission. For example in many HEVs the axial distance (e.g., $d_a$ as shown in FIG. 9) between the engine and the transmission is less than 160 mm. In at least one embodiment, the axial distance $d_a$ is less than 135 mm. In these HEVs, the compact configuration of the electric machine 10 including a rotor 16 and stator assembly 50 with commonly housed engine disconnect clutch 30 and dual clutch 40, allows the entire housing 12 of the electric machine 10 to fit between the engine 82 and the transmission 84. The compact configuration of the electric machine is attributed in part to the unitary rotor carrier 20 with a combined rotor hub and clutch housing.

The foregoing detailed description of one or more exemplary embodiments of the electric machine with compact configuration has been presented herein by way of example only and not limitation. It will be recognized that there are advantages to certain individual features and functions described herein that may be obtained without incorporating other features and functions described herein. For example, while the foregoing embodiments included specific clutch arrangements, in various embodiments the electric machine with compact configuration may include different clutch arrangements.

Figure 10:
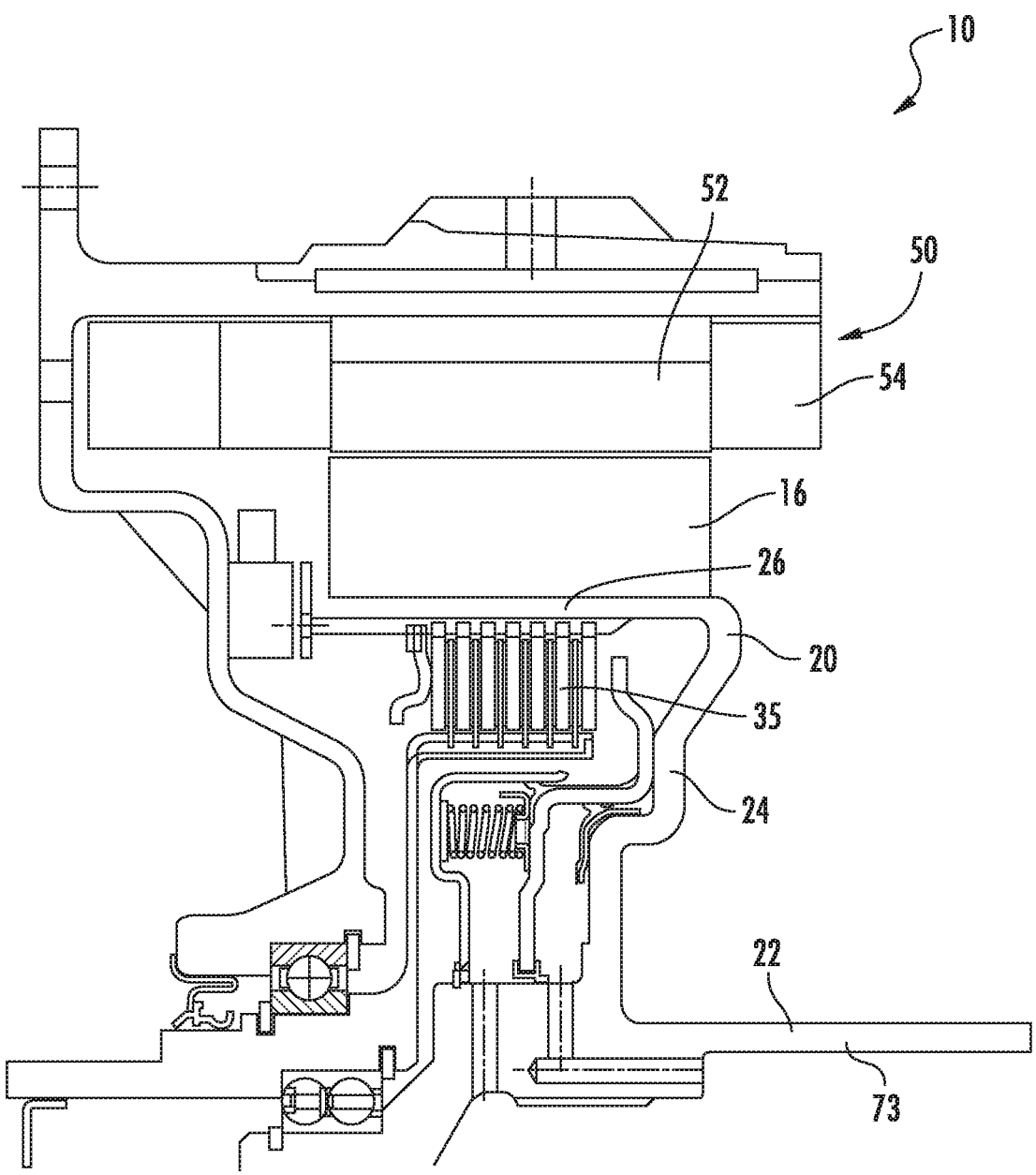
FIG. 10 shows a cross-sectional view of yet another embodiment of a rotor carrier and clutch housing for an electric machine.

FIG. 10, illustrates one example of such an electric machine 10 that includes a combined launch clutch and disconnect clutch 35. Similar to the electric machines of FIGS. 1-4, the electric machine 10 includes a rotor 16 positioned within a stator assembly 50. The stator assembly includes a core 52 with windings 54. The rotor is retained by a rotor carrier 20. The rotor carrier 20 is a unitary component that extends from an engine output shaft to the rotor 16. Similar to the embodiment of FIG. 4, the rotor carrier 20 shown in FIG. 10 includes a hub portion 22 that forms part of the engine output shaft 73, a radial portion 24, and a cylindrical portion 26. Unlike the embodiment of FIG. 4, the rotor carrier 20 shown in FIG. 10 does not include a second cylindrical portion because the rotor carrier is used in an arrangement with the combined launch clutch and disconnect clutch 35. This clutch arrangement is advantageous for certain applications, such as a torque converter replacement.

In view of the foregoing, it will be recognized that various alternatives, modifications, variations, or improvements of the above-disclosed exemplary embodiments and other features and functions, or alternatives thereof, may be desirably combined into many other different embodiments, systems or applications. As yet another example, although the HEV disclosed herein is an automobile HEV, it will be recognized that the vehicle may be provided in different forms such as a boat, aircraft, or any of various other vehicles.

Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An electric machine comprising:
a stator assembly;
a rotor positioned within the stator assembly, the rotor defining an inner diameter;
a rotor carrier positioned within the stator assembly and coupled to the rotor, the rotor carrier including a hub portion, a first cylindrical portion coupled to the hub portion and defining a first inner surface having a diameter that is less than the inner diameter of the rotor, and a second cylindrical portion extending from the first cylindrical portion and defining a second inner surface having a diameter that is greater than the inner diameter of the rotor;
a first clutch positioned within the rotor carrier and engaging the first inner surface of the first cylindrical portion of the rotor carrier; and
a second clutch positioned within the rotor carrier and engaging the second inner surface of the second cylindrical portion of the rotor carrier.

2. The electric machine of claim 1, wherein the hub portion, the first cylindrical portion, and the second cylindrical portion are an integrally formed unitary component.

3. The electric machine of claim 2 wherein the first clutch includes a first plurality of clutch plates that engage the inner surface of the first cylindrical portion, and the second clutch includes a second plurality of clutch plates that engage the inner surface of the second cylindrical portion.

4. The electric machine of claim 1 wherein the rotor carrier further includes a radial wall extending radially between the first cylindrical portion and the second cylindrical portion.

5. The electric machine of claim 1 wherein the rotor is positioned on an outer surface of the first cylindrical portion.

6. The electric machine of claim 1 wherein the first cylindrical portion is positioned within the rotor, and wherein the second cylindrical portion is positioned within the stator assembly and axially adjacent to the rotor such that the second cylindrical portion is positioned outside of the rotor within the stator assembly.

7. The electric machine of claim 6, wherein the first clutch includes a first plurality of clutch plates positioned within the rotor, and the second clutch includes a second plurality of clutch plates that are axially adjacent to the rotor.

8. The electric machine of claim 1 wherein the second clutch is a transmission clutch including an outer clutch positioned within the second cylindrical portion of the rotor carrier and an inner clutch positioned within the first cylindrical portion of the rotor carrier.

9. The electric machine of claim 1 further comprising a first radial portion and a second radial portion, the first radial portion extending between the hub portion and the first cylindrical portion, and the second radial portion extending between the first cylindrical portion and the second cylindrical portion.

10. An electric machine comprising:
a stator assembly;
a rotor positioned within the stator assembly, the rotor defining an inner rotor diameter;
a rotor carrier positioned within the stator assembly and coupled to the rotor, the rotor carrier including a first cylindrical portion having an inner surface defining an inner diameter that is less than the inner rotor diameter, a second cylindrical portion having an inner surface defining a diameter that is greater than the inner rotor diameter, and a radial portion extending radially between the first cylindrical portion and the second cylindrical portion, wherein the first cylindrical portion, the radial portion, and the second cylindrical portion are an integrally formed unitary component;
a first clutch positioned within the first cylindrical portion of the rotor carrier; and
a second clutch positioned within the second cylindrical portion of the rotor carrier.

11. The electric machine of claim 10, wherein the first cylindrical portion includes an outer surface connected to the rotor.

12. The electric machine of claim 10, wherein the first clutch includes a first plurality of clutch plates that engage the inner surface of the first cylindrical portion, and the second clutch includes a second plurality of clutch plates that engage the inner surface of the second cylindrical portion.

13. The electric machine of claim 10, wherein the second cylindrical portion is positioned within the stator assembly and axially adjacent to the rotor such that the second cylindrical portion is positioned outside of the rotor within the stator assembly.

14. The electric machine of claim 10, wherein the electric machine further comprises an engine output shaft and the rotor carrier further comprises a hub portion coupled to the engine output shaft.

* * * * *